US012695805B2

(12) United States Patent
Jain et al.

(10) Patent No.: US 12,695,805 B2
(45) Date of Patent: Jul. 28, 2026

(54) SYSTEM AND A METHOD FOR MANAGING VR DEVICE OPERATIONS IN AN IoT ENVIRONMENT

(71) Applicant: SAMSUNG ELECTRONICS CO., LTD., Suwon-si (KR)

(72) Inventors: Ankit Jain, Delhi (IN); Siba Prasad Samal, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 3 days.

(21) Appl. No.: 18/805,260

(22) Filed: Aug. 14, 2024

(65) Prior Publication Data

US 2025/0274520 A1      Aug. 28, 2025

Related U.S. Application Data

(63) Continuation of application No. PCT/KR2024/009511, filed on Jul. 4, 2024.

(30) Foreign Application Priority Data

Feb. 26, 2024    (IN) .............................. 202441013757

(51) Int. Cl.
| | |
|---|---|
| *G06F 15/16* | (2006.01) |
| *H04L 67/131* | (2022.01) |
| *G06F 3/01* | (2006.01) |

(52) U.S. Cl.
CPC ............ *H04L 67/131* (2022.05); *G06F 3/011* (2013.01)

(58) Field of Classification Search
CPC ............... H04L 67/131; H04L 41/0816; H04L 41/0883; H04L 41/22
See application file for complete search history.

(56) References Cited

U.S. PATENT DOCUMENTS

| | | | |
|---|---|---|---|
| 10,055,887 B1 * | 8/2018 | Gil | .......................... G06F 1/163 |
| 10,261,671 B2 | 4/2019 | Park et al. | |

(Continued)

FOREIGN PATENT DOCUMENTS

| | | |
|---|---|---|
| CN | 112214108 A | 1/2021 |
| WO | 2016/073734 A1 | 5/2016 |

OTHER PUBLICATIONS

Community, "HR function not working while sweaty", FITBIT, 2024, https://community.fitbit.com/t5/Alta-HR/HR-function-not-working-while-sweaty/td-p/2569952. (11 pages total).
"Chest vs Arm Heart Rate Sensors: What's the Difference?", Cyclabo, Nov. 28, 2021, https://www.cyclabo.com/topics/8c92t89x72/. (11 pages total).
"1*Head Strap with Battery for Quest 2+1*VR Fan for Oculus Quest 2", Alcopanda, https://www.amazon.com/Alcopanda-Strap-Battery-Quest-Oculus/dp/BOBMKX4Q52. (4pages total), Nov. 16, 2022 (date first available as listed in webpage), Copyright 1996-2024.

(Continued)

*Primary Examiner* — Duyen M Doan
(74) *Attorney, Agent, or Firm* — Sughrue Mion, PLLC

(57) ABSTRACT

A method for a Virtual Reality (VR) device in an Internet of Things (IoT) environment, the method may include: obtaining sensor data from the VR device; identifying at least one discontinuity in at least one operation associated with the VR device while a user is using the VR device, based on the sensor data; determining at least one ambient parameter around the VR device causing the at least one discontinuity in the at least one operation; identifying at least one IoT device capable of modifying the at least one ambient parameter; and controlling one or more operational characteristics of the at least one IoT device to modify the at least one ambient parameter around the VR device to reduce the at least one discontinuity in the at least one operation.

20 Claims, 9 Drawing Sheets

(56)     References Cited

U.S. PATENT DOCUMENTS

| 10,708,653 B1 * | 7/2020 | Stinson .............. H04N 21/4415 |
| 11,050,994 B2 | 6/2021 | Diverdi et al. |
| 2017/0011210 A1 * | 1/2017 | Cheong ................. A61B 5/681 |
| 2017/0169614 A1 | 6/2017 | Tommy et al. |
| 2019/0278621 A1 | 9/2019 | Thomas et al. |
| 2019/0392604 A1 | 12/2019 | Keen et al. |
| 2022/0180725 A1 * | 6/2022 | Arora ................. G08B 21/0446 |
| 2022/0188545 A1 * | 6/2022 | Nagar .................... G06V 20/20 |
| 2022/0301230 A1 | 9/2022 | Nagar et al. |
| 2023/0069042 A1 | 3/2023 | Tham et al. |
| 2023/0245452 A1 * | 8/2023 | Tan ........................ G06V 20/44 |
| | | 348/143 |
| 2023/0359421 A1 | 11/2023 | Nienstedt et al. |

OTHER PUBLICATIONS

International Search Report dated Nov. 1, 2024 issued by the International Searching Authority in International Application No. PCT/KR2024/009511.

Simiscuka et al., "Real-Virtual World Device Synchronization in a Cloud-Enabled Social Virtual Reality IoT Network", IEEE Access, 2019, vol. 7, DOI: 10.1109/ACCESS.2019.2933014, pp. 106588-106599 (13 pages total).

* cited by examiner

FIG. 6

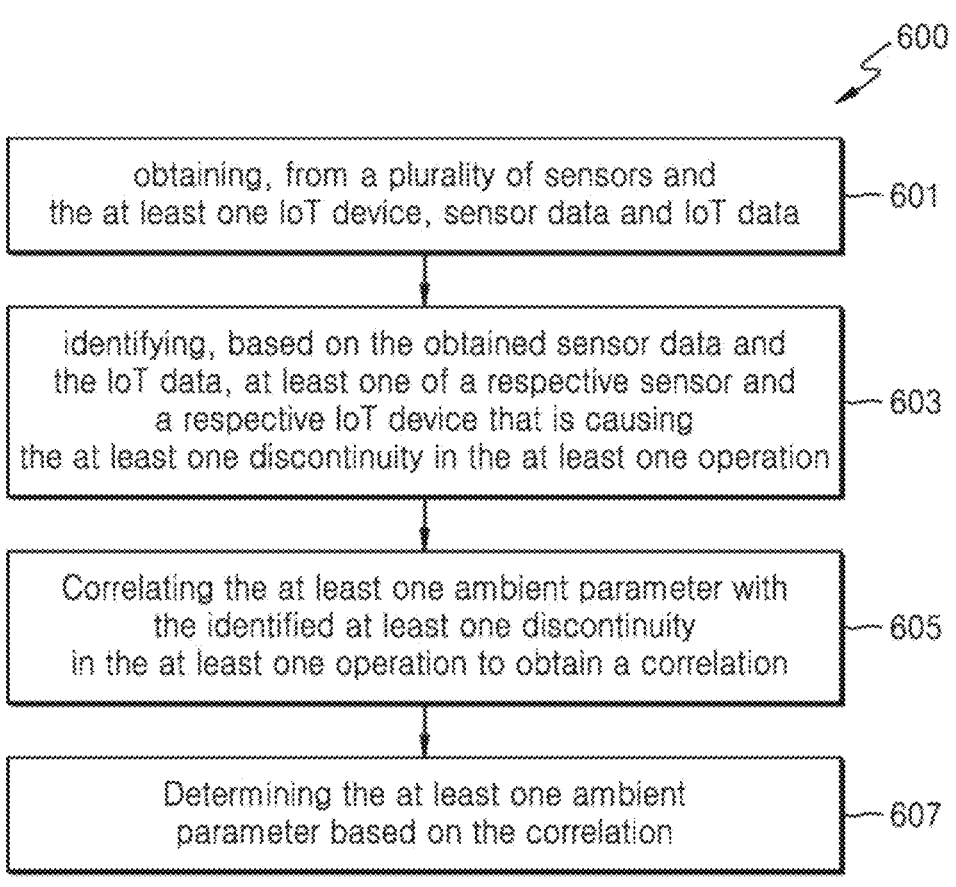

600 obtaining, from a plurality of sensors and
the at least one IoT device, sensor data and IoT data

601 identifying, based on the obtained sensor data and
the IoT data, at least one of a respective sensor and
a respective IoT device that is causing
the at least one discontinuity in the at least one operation

603

Correlating the at least one ambient parameter with
the identified at least one discontinuity
in the at least one operation to obtain a correlation

605

Determining the at least one ambient
parameter based on the correlation

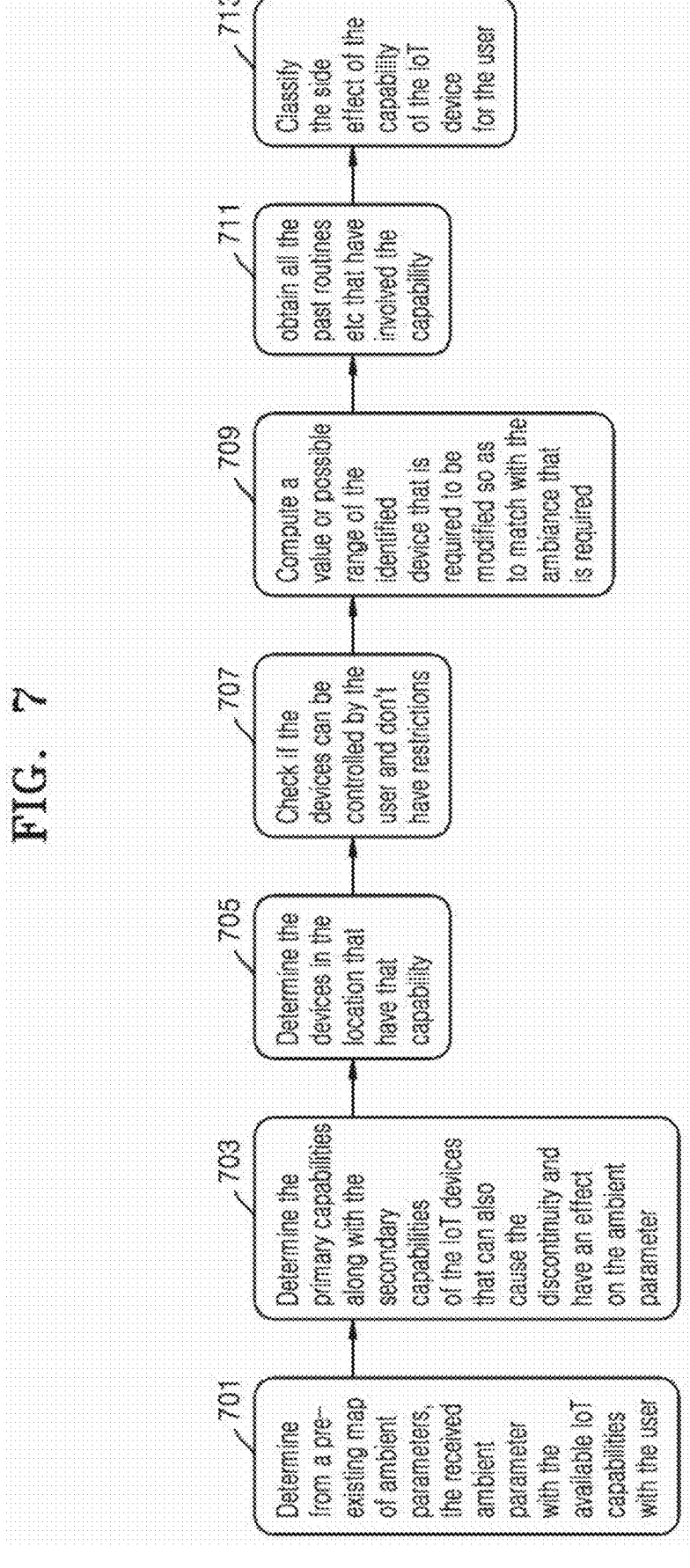

701 — Determine from a pre-existing map of ambient parameters, the received ambient parameter with the available IoT capabilities with the user 703 — Determine the primary capabilities along with the secondary capabilities of the IoT devices that can also cause the discontinuity and have an effect on the ambient parameter 705 — Determine the devices in the location that have that capability 707 — Check if the devices can be controlled by the user and don't have restrictions 709 — Compute a value or possible range of the identified device that is required to be modified so as to match with the ambiance that is required 711 — obtain all the past routines etc that have involved the capability 713 — Classify the side effect of the capability of the IoT device for the user

FIG. 8

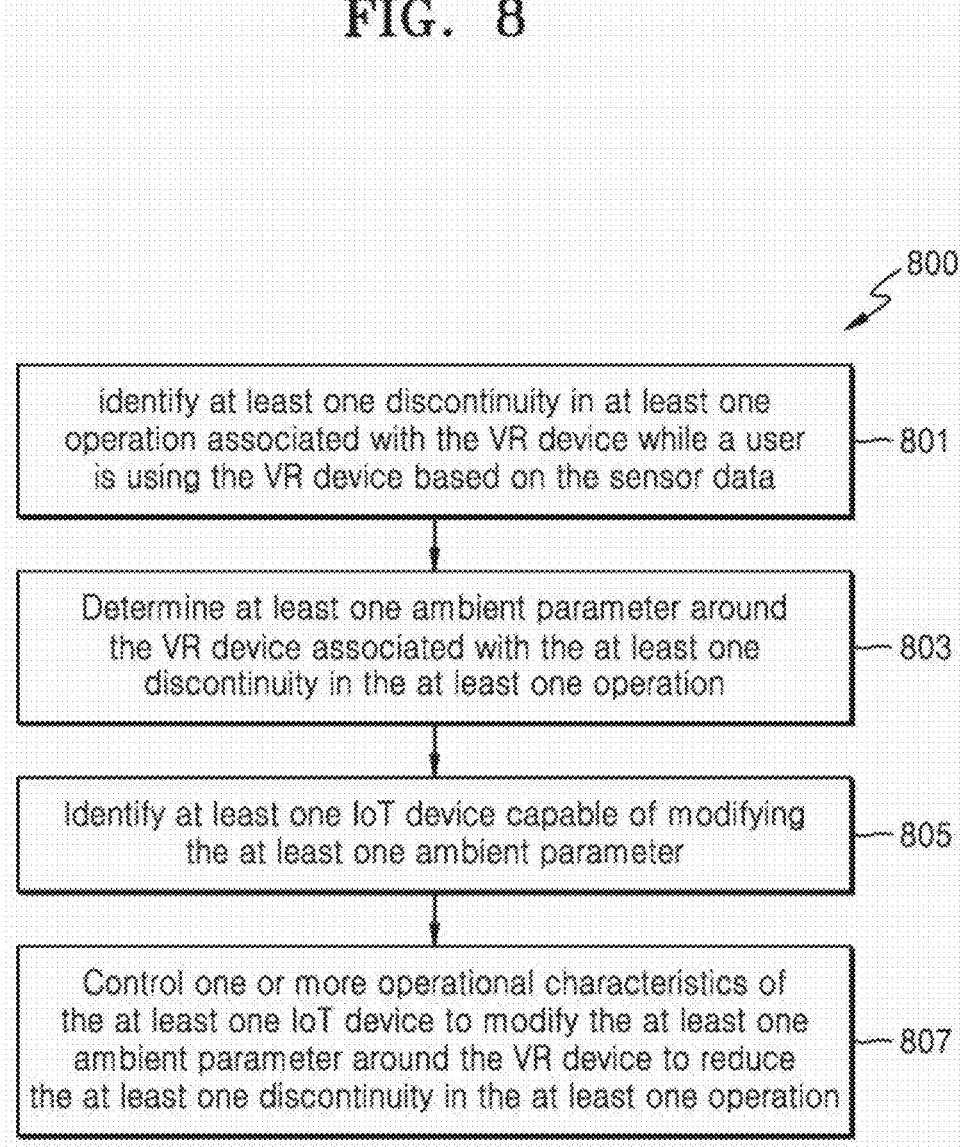

800 identify at least one discontinuity in at least one operation associated with the VR device while a user is using the VR device based on the sensor data — 801

Determine at least one ambient parameter around the VR device associated with the at least one discontinuity in the at least one operation — 803

Identify at least one IoT device capable of modifying the at least one ambient parameter — 805

Control one or more operational characteristics of the at least one IoT device to modify the at least one ambient parameter around the VR device to reduce the at least one discontinuity in the at least one operation — 807

SYSTEM AND A METHOD FOR MANAGING VR DEVICE OPERATIONS IN AN IoT ENVIRONMENT

CROSS-REFERENCE TO RELATED APPLICATIONS

This application is a continuation application, claiming priority under § 365 (c), of an International application No. PCT/KR2024/009511, filed on Jul. 4, 2024, which is based on and claims the benefit of a Indian Patent Application number 202441013757, filed on Feb. 26, 2024, in the Indian Patent Office, the disclosure of which is incorporated by reference herein in its entirety.

BACKGROUND

1. Field

The present disclosure, in general, relates to systems and methods for managing virtual reality (VR) device operations in an Internet of Things (IoT) environment. More particularly, the disclosure relates to identifying discontinuities in the operation of the VR device due to an ambient parameter associated with an ambient environment and modifying the ambient parameter by using a nearby IoT device to reduce the discontinuities.

2. Description of Related Art

As technology continues to advance, virtual reality (VR) devices have emerged as innovative devices that provide users with immersive experiences. However, the optimal functioning of VR devices like VR headsets heavily depends on the performance of their sensors under specific operating conditions. When these specific operating conditions are not met, it can lead to suboptimal performance, causing various issues that can disrupt the user experience.

For example, the sensors may irregularly start and stop. In particular, the sensors may start providing sensor values when optimal ambient conditions are met and may irregularly stop when the optimal ambient conditions slightly vary, despite the user being engaged with the VR device. For example, consider a scenario in which the user is wearing the VR headset and due to the user's movement in the direction of a light source, the ambient illumination value suddenly shoots up. Consider another example scenario in which the user goes into a dark-lit room, and hence the ambiance illumination value goes to zero. Thus, ambiance parameters like the ambiance illumination value have caused a discontinuity in the operation of the VR device.

Further, the sensors may provide inconsistent sensor values or sensor readings. The inconsistent sensor values can result in periods where the sensor readings become steady, hindering accurate user interaction and experience. This generally happens when the sensor is unable to fetch the latest sensor values and hence provides the previously fetched sensor value instead. For example, consider a scenario where for hand tracking, the sensor might not be able to detect a new position and so gives the last position coordinates. Thus, due to the inconsistent performance of the sensor, there is a discontinuity in the operation of the VR device.

Additionally, the sensors may provide non-co-relatable sensor values which can occur when multiple sensors are triggered simultaneously, leading to discrepancies and challenges in interpreting user actions and environmental factors accurately. For example, due to the fog on the display, the motion tracking may give new motion coordinates but while performing an eye-based navigation tracking, the VR device is unable to give coordinates for the same.

When the ambient parameter causes discontinuity in the performance of VR headsets, the users are required to manually adjust the ambient environment without guidance from the headset itself. This manual intervention disrupts the immersive experience and adds an extra layer of complexity for users. Rather than seamlessly adapting to changes in ambient conditions, the user must take the initiative to understand and modify the ambient parameters so that the VR headset can function continuously. This process can be cumbersome and detracts from the immersive and user-friendly nature of VR technology.

Thus, the proper functioning of the VR headsets is linked to the performance of their sensors, which are sensitive to specific operating conditions in the ambient environment. Irregularities in the sensor behaviour, discontinuities in the performance of the sensor due to the changes in the ambient conditions in the ambient environment, and the lack of solutions for improving the ambient parameters by the headset underline the challenges faced by the users in maintaining the immersive and seamless virtual experience.

SUMMARY

This summary is provided to introduce a selection of concepts, in a simplified format, that are further described in the detailed description. This summary is neither intended to identify key or essential inventive concepts of the disclosure and nor is it intended for determining the scope of the disclosure.

According to an embodiment of the present disclosure, a method for a Virtual Reality (VR) device in an Internet of Things (IoT) environment, the method may include obtaining sensor data from the VR device. According to an embodiment of the present disclosure, a method for a Virtual Reality (VR) device in an Internet of Things (IoT) environment, the method may include identifying at least one discontinuity in at least one operation associated with the VR device while a user is using the VR device, based on the sensor data. According to an embodiment of the present disclosure, a method for a Virtual Reality (VR) device in an Internet of Things (IoT) environment, the method may include determining at least one ambient parameter around the VR device associated with the at least one discontinuity in the at least one operation. According to an embodiment of the present disclosure, a method for a Virtual Reality (VR) device in an Internet of Things (IoT) environment, the method may include identifying at least one IoT device capable of modifying the at least one ambient parameter. According to an embodiment of the present disclosure, a method for a Virtual Reality (VR) device in an Internet of Things (IoT) environment, the method may include controlling one or more operational characteristics of the at least one IoT device to modify the at least one ambient parameter around the VR device to reduce the at least one discontinuity in the at least one operation.

According to an embodiment of the present disclosure, an apparatus configured to connect with a Virtual Reality (VR) device in an Internet of Things (IoT) environment, the apparatus may include at least one memory storing instructions. According to an embodiment of the present disclosure, an apparatus configured to connect with a Virtual Reality (VR) device in an Internet of Things (IoT) environment, the apparatus may include one or more processors operatively connected to the at least one memory. According to an embodiment of the present disclosure, one or more processors may be configured to obtain sensor data from the VR device. According to an embodiment of the present disclosure, one or more processors may be configured to identify at least one discontinuity in at least one operation associated with the VR device while a user is using the VR device, based on the sensor data. According to an embodiment of the present disclosure, one or more processors may be configured to determine at least one ambient parameter around the VR device associated with the at least one discontinuity in the at least one operation. According to an embodiment of the present disclosure, one or more processors may be configured to identify at least one IoT device capable of modifying the at least one ambient parameter. According to an embodiment of the present disclosure, one or more processors may be configured to control one or more operational characteristics of the at least one IoT device to modify the at least one ambient parameter around the VR device to reduce the at least one discontinuity in the at least one operation.

One embodiment provides a machine readable medium containing instructions. The instructions, when executed by at least one processor, may cause the at least one processor to perform the method corresponding.

To further clarify the advantages and features of the disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings.

BRIEF DESCRIPTION OF THE DRAWINGS

These and other features, aspects, and advantages of the disclosure will become better understood when the following detailed description is read with reference to the accompanying drawings in which like characters represent like parts throughout the drawings, wherein:

FIG. 6 illustrates a method for the determination of the ambient parameters by the discontinuity correlator module, according to an embodiment of the present disclosure;

FIG. 7 illustrates a method implemented in the capability correlator module, according to an embodiment of the present disclosure;

FIG. 8 illustrates a method flow of the smart device, according to an embodiment of the present disclosure.

Figure 1:
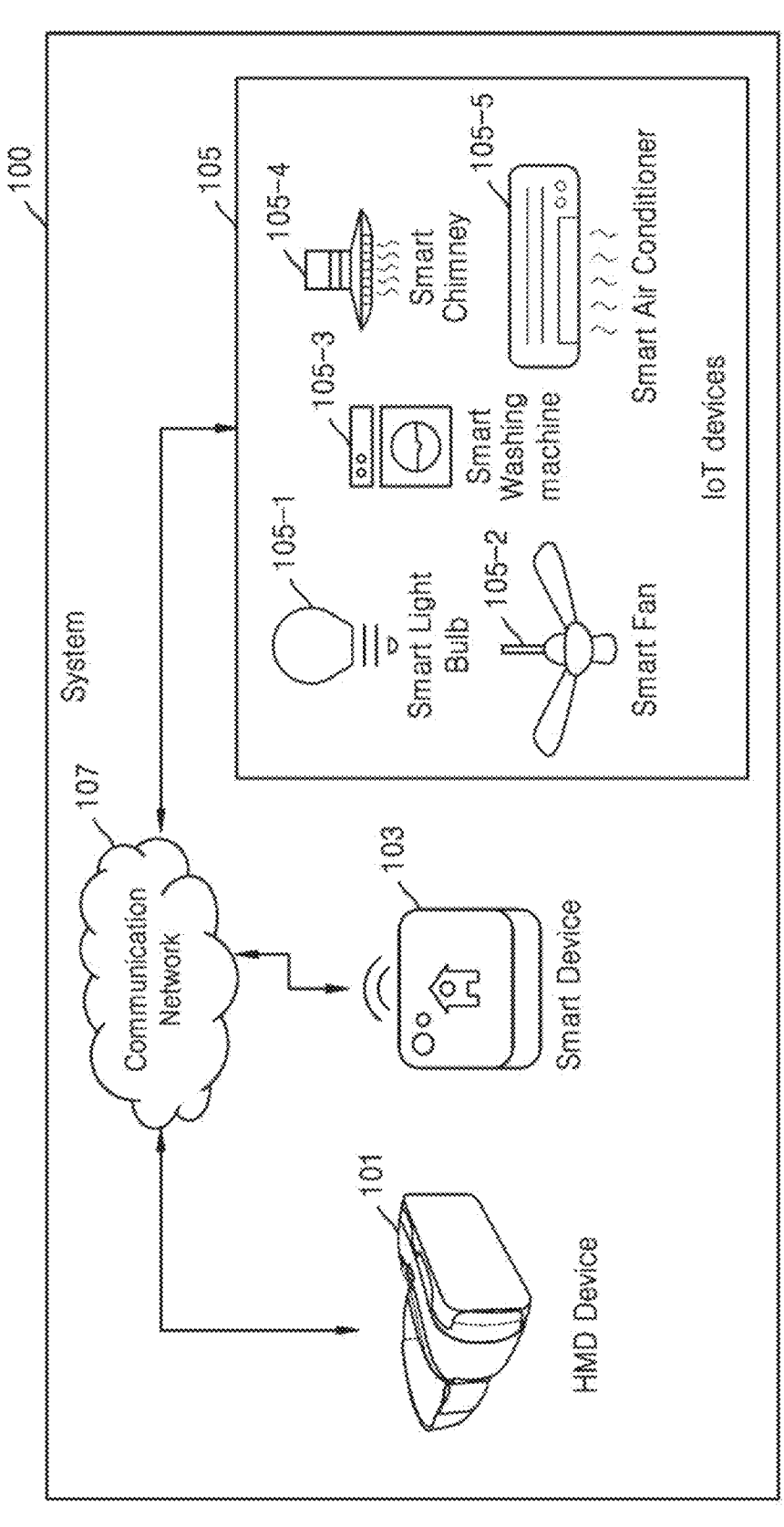
FIG. 1 illustrates an example of IoT environment having a smart device to manage HMD device operations, according to an embodiment of the present disclosure.

Further, skilled artisans will appreciate that elements in the drawings are illustrated for simplicity and may not have been necessarily been drawn to scale. For example, the flow charts illustrate the method in terms of the most prominent operations involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having the benefit of the description herein.

DETAILED DESCRIPTION

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures or components preceded by "comprises . . . a" does not, without more constraints, preclude the existence of other devices or other sub-systems or other elements or other structures or other components or additional devices or additional sub-systems or additional elements or additional structures or additional components.

FIG. 1 illustrates an example of IoT environment having a smart device to manage HMD device operations, according to an embodiment of the present disclosure. According to an embodiment, the IoT environment includes a system 100. In an embodiment, the system 100 may include a Head Mounted Device (HMD) device 101, a smart device 103, and one or more IoT devices 105. Consider a scenario where the HMD device 101 is operatively coupled with the smart device 103 via a communication network 107. According to an embodiment, the smart device 103 may be further operatively coupled with the one or more IoT devices 105 via the communication network 107. In an example, scenario, the one or more IoT devices may include but are not limited to, a smart light bulb 105-1, a smart fan 105-2, a smart washing machine 105-3, a smart chimney 105-4, a smart air conditioner (AC) 105-5, and the like. It is to be noted that one or more IoT devices are collectively referred to as one or more IoT devices 105. Further, the one or more IoT devices 105 may be interchangeably referred to as IoT devices 105 throughout the disclosure.

In an example, the HMD device 101 may be implemented with technologies like Virtual Reality (VR), extended reality (XR), Augmented Reality (AR), and Mixed Reality (MR). Accordingly, the HMD device 101 may be alternatively referred to as a VR device, an XR device, an AR device, and an MR device depending on the specific technology integrated within the HMD device 101. In an example, the smart device 103 may correspond to a hub device such as a smart central home monitoring device, smart television, family hub, tablet, personal computer (PC), monitor, hub core software, and the like. In an example, the IoT devices 105 may correspond to a smart light bulb 105-1, a smart fan 105-2, a smart washing machine 105-3, a smart chimney 105-4, a smart air conditioner (AC) 105-5, and the like.

Consider an example scenario, where a user is using the HMD device 101 in the IoT environment without an active airflow. The lack of active airflow may occur due to different swing levels, fan speed, swing direction of the smart AC 105-5 or the smart fan 105-2, and the like. As a result, the lenses of the headset may begin to fog up while the user is using the HMD device 101, leading to diminished display visibility to the user. Thus, the discontinuity occurred in the operation of the HMD device 101. This adversely affects the operation of the headset and further leads to a bad user experience. In an example, the discontinuity may be abnormally functioning of HMD headset as the hand tracking and the headset tracking features are not working properly in changing environment (e.g., brightness, humidity, etc.).

According to an embodiment, the system 100 may overcome the various issues as discussed in the above paragraphs. In an embodiment, the system 100 may identify at least one discontinuity in at least one operation associated with the HMD device 101 while a user is using the HMD device. The system 100 further correlates the discontinuity with ambient parameters around the HMD device 101 to determine the IoT devices and capabilities of the IoT devices that can be modified to reduce the discontinuities in at least one operation associated with the HMD device 101. A detailed operation of the system 100 will be explained in the forthcoming paragraphs.

Figure 2:
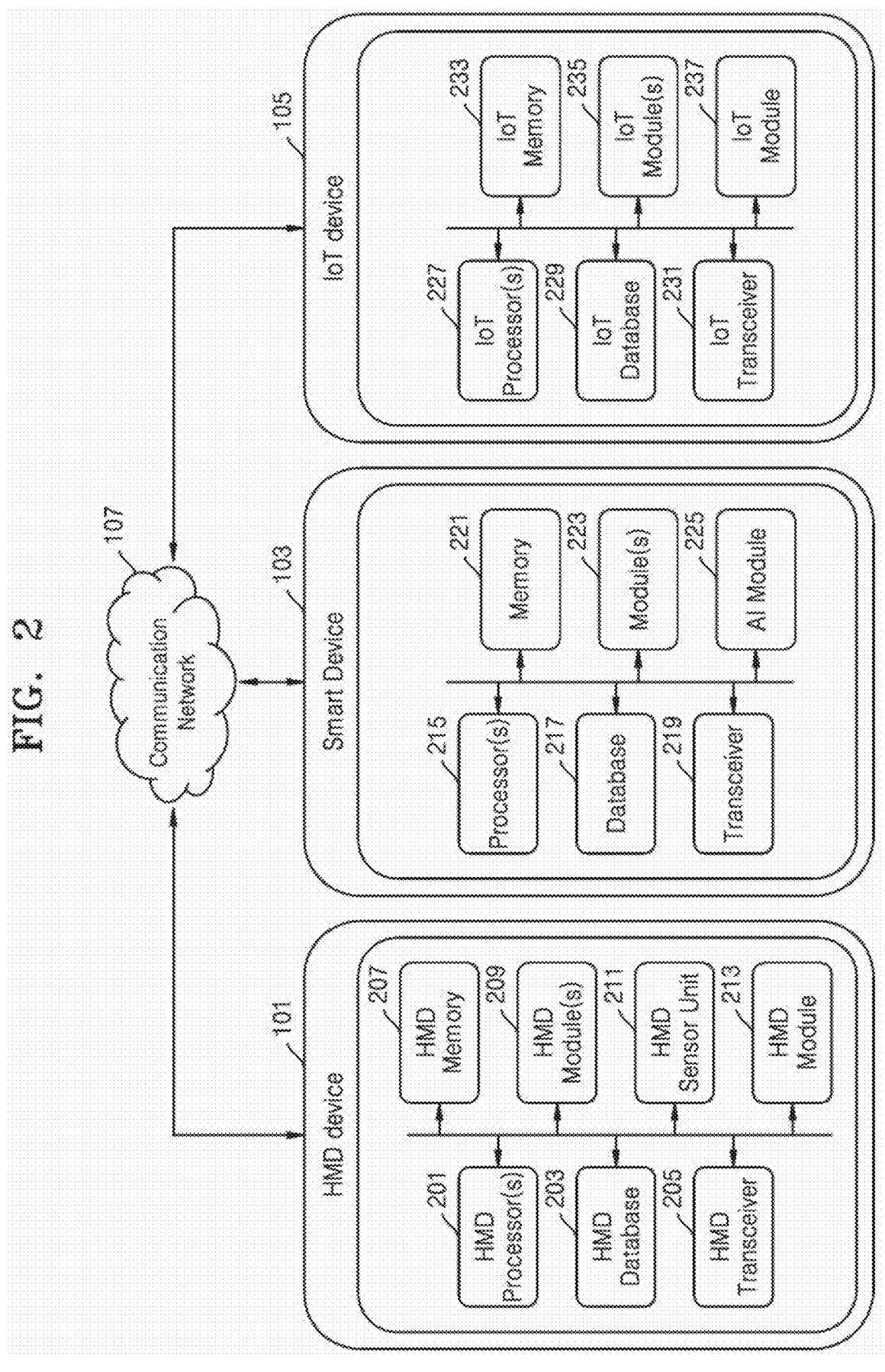
FIG. 2 illustrates a detailed block diagram of a system for managing VR device operations in the IoT environment, according to an embodiment of the present disclosure.

FIG. 2 illustrates a detailed block diagram of the system 100 for managing VR device operations in the IoT environment, according to an embodiment of the present disclosure. In an embodiment, the HMD device 101 may include an HMD processor(s) 201, an HMD database 203, an HMD transceiver 205, an HMD memory 207, an HMD Module(s) 209, an HMD sensor unit 211, and an HMD AI module 213. Likewise, the smart device 103 may include a processor(s) 215, a database 217, a transceiver 219, a memory 221, a module(s) 223, and an AI module 225. Further, each IoT device 105 may include an IoT processor(s) 227, an IoT database 229, an IoT transceiver 231, an IoT memory 233, an IoT module(s) 235, and an IoT AI module 237. The above memories may each be more than one memory.

In an example, the HMD processor(s) 201, the processor(s) 215, and the IoT processor(s) 227 may be operatively coupled with their respective module(s) i.e. the HMD module(s) 209, the module(s) 223, and the IoT module(s) 235 respectively for processing, executing or performing a set of operations. In an embodiment, the HMD processor(s) 201, the processor(s) 215, and the IoT processor(s) 227 may include at least one data processor for executing processes in a Virtual Storage Area Network. The HMD processor(s) 201, the processor(s) 215, and the IoT processor(s) 227 may include specialized processing units such as integrated system (bus) controllers, memory management control units, floating point units, graphics processing units, digital signal processing units, etc. In one embodiment, the HMD processor(s) 201, the processor(s) 215, and the IoT processor(s) 227 may include a central processing unit (CPU), a graphics processing unit (GPU), or both. The HMD processor(s) 201, the processor(s) 215, and the IoT processor(s) 227 may be one or more general processors, digital signal processors, application-specific integrated circuits, field-programmable gate arrays, servers, networks, digital circuits, analog circuits, combinations thereof, or other currently-known or later developed devices for analyzing and processing data. The HMD processor(s) 201, the processor(s) 215, and the IoT processor(s) 227 may execute one or more instructions, such as code generated manually (i.e., programmed) to perform one or more operations disclosed herein throughout the disclosure.

In an example, the HMD database 203, the database 217, and the IoT database 229 may be implemented with integrated hardware and software. The hardware may include a hardware disk controller with programmable search capabilities or a software system running on general-purpose hardware. Examples of the HMD database 203, the database 217, and the IoT database 229 are but are not limited to, in-memory databases, cloud databases, distributed databases, embedded databases, and the like. The HMD database 203, the database 217, and the IoT database 229, among other things, serve as a repository for storing data processed, received, and generated by one or more of the HMD processor(s) 201, the processor(s) 215, and the IoT processor(s) 227, and the HMD module(s) 209, the module(s) 223, and the IoT module(s) 235.

In an example, the HMD transceiver 205, the transceiver 219, and the IoT transceiver 231 may be a transmitter and a receiver unit. The HMD transceiver 205, the transceiver 219, and the IoT transceiver 231 may communicate with each other via the communication network implemented with any of the wireless standards, such as 3G, 4G, 5G, or the like. Further, other wireless techniques, such as Wi-Fi, Bluetooth, etc. may also be used by the HMD transceiver 205, the transceiver 219, and the IoT transceiver 231 for communicating with each other.

In an example, the HMD memory 207, the memory 221, and the IoT memory 233 may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. Each of the HMD memory 207, the memory 221, and the IoT memory 233 are communicatively coupled with their respective processors i.e. the HMD processor(s) 201, the processor(s) 215, and the IoT processor(s) 227 to store user usage data, sensor data (e.g. past sensor values collected by the sensors at previous time instances, current sensors values collected by the sensors at current time instances, continuous state of the sensor data, pre-stored sensor data and the like) or processing instructions for completing one or more processes. Furthermore, each of the HMD memory 207, the memory 221, and the IoT memory 233 may include their respective HMD database 203, the database 217, and the IoT database 229 to store the information as required by their respective HMD module(s) 209, the module(s) 223, and the IoT module(s) 235 and the HMD processor(s) 201, the processor(s) 215, and the IoT processor(s) 227. Further, the HMD memory 207, the memory 221, and the IoT memory 233 may store one or more values, such as, but not limited to, one or more output values of the sensor data, threshold values, etc. Furthermore, the HMD memory 207, the memory 221, and the IoT memory 233 may store the HMD module(s) 209, the module(s) 223, IoT module(s) 235, or one or more models for performing operations as disclosed throughout the disclosure.

As an example, the HMD module(s) 209, the module(s) 223, and the IoT module(s) 235 may include a program, a subroutine, a portion of a program, a software component, or a hardware component capable of performing a stated task or function. As used herein, the HMD module(s) 209, the module(s) 223, and the IoT module(s) 235 may be implemented on a hardware component such as a server independently of other modules, or a module can exist with other modules on the same server, or within the same program, or in the cloud, Smart-home edge software, or on the IoT devices 105. The HMD module(s) 209, the module(s) 223, and the IoT module(s) 235 may be implemented on a hardware component such as processor one or more microprocessors, microcomputers, microcontrollers, digital signal processors, central processing units, state machines, logic circuitries, and/or any devices that manipulate signals based on operational instructions. The HMD module(s) 209, the module(s) 223, and the IoT module(s) 235 when executed by the HMD processor(s) 201, the processor(s) 215, and the IoT processor(s) 227 may be configured to perform any of the described functionalities.

As an example, the HMD sensor unit 211 may include a plurality of sensors, tracking cameras, microphones, scanners, Light Emitting Diode (LED) illuminators, IR cameras, a lip tracking camera, IR Illuminators, 6DOF Cameras, SLAM Cameras, Face tracking Camera, and the like. In an example, the plurality of sensors includes camera sensors, motion sensors, depth sensors, heart rate sensors, proximity sensors, tracking sensors, sound sensors, gyro sensors, acceleration sensors, pressure sensors, and hall effect sensors. In an embodiment, the HMD sensor unit 211 may send the sensor data to the smart device 103 for identifying at least one discontinuity in the at least one operation associated with the VR device while a user is using the VR device.

In an example, the HMD AI module 213, the AI module 225, and the IoT AI module 237 may include a plurality of neural network layers. Examples of neural networks include, but are not limited to, convolutional neural network (CNN), deep neural network (DNN), recurrent neural network (RNN), and Restricted Boltzmann Machine (RBM). The learning technique is a method for training a predetermined target device using a plurality of learning data to cause, allow, or control the target device to make a determination or prediction. Examples of learning techniques include, but are not limited to, supervised learning, unsupervised learning, semi-supervised learning, or reinforcement learning. At least one of a plurality of CNN, DNN, RNN, RBM models and the like may be implemented to thereby achieve execution of the present subject matter's mechanism through an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or more plurality of processors control the processing of the input data in accordance with a predefined operating rule or artificial intelligence (AI) model stored in the non-volatile memory and the volatile memory. The predefined operating rule or artificial intelligence model is provided through training or learning.

Figure 3:
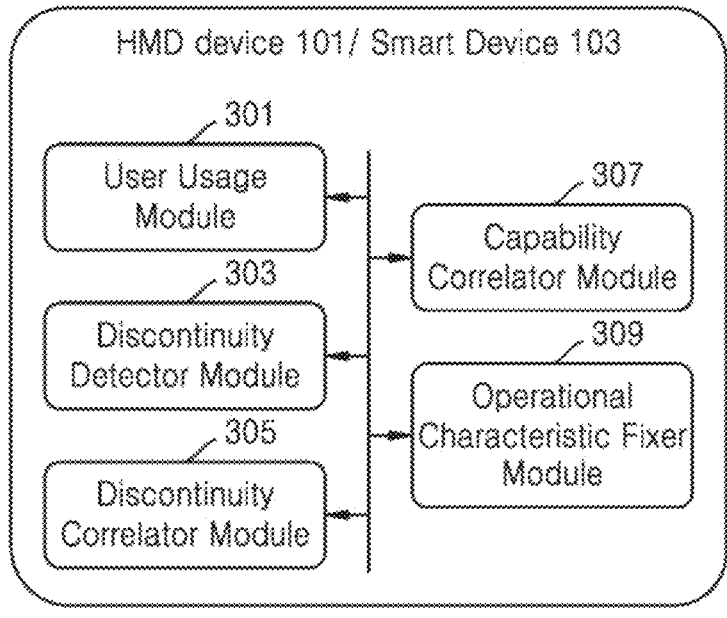
FIG. 3 illustrates various components included in the HMD device and the smart device respectively, according to an embodiment of the present disclosure.

FIG. 3 illustrates various components included in the HMD device 101 and the smart device 103 respectively, according to an embodiment of the present disclosure. According to an embodiment, the HMD module(s) 209 of the HMD device 101 or the module(s) 223 of the smart device 103 may include a user usage module 301, a discontinuity detector module 303, a discontinuity correlator module 305, a capability correlator module 307, and the operational characteristic fixer module 309. According to an embodiment, the user usage module 301, the discontinuity detector module 303, and the discontinuity correlator module 305 may be implemented in the HMD device 101 and the capability correlator module 307, and the operational characteristic fixer module 309 may be implemented in the smart device 103. According to some embodiment, the processors i.e. the HMD processor 201, the processor 215, associated with the respective modules may cause the aforesaid modules to perform various functions. The detailed working of each component will be explained with respect to the modules in the forthcoming paragraphs for ease of explanation.

According to an embodiment, the user usage module 301 may get user usage data of the user using the HMD device 101 and the features the user is likely to use. According to an embodiment, as the user starts using the HMD device 101, the user usage module 301, at first may identify the user. As an example, the user usage module 301 may identify the user by using credential information provided by the user during logging in the HMD device 101. Further, the user usage module 301 identifies a current application that the user is running on the HMD device 101 and the at least one operation associated with the HMD device 101. In an example, the current applications may be related to gaming applications, navigation applications, virtual meetings, and the like. Based on the identification of the current application, the user usage module 301 identifies the at least one operation associated with the HMD device 101. The at least one operation may be alternately referred to as 'operations' hereinafter throughout the disclosure. Accordingly, in an example, the operations associated with the current application may include finger-tracking, audio-tracking, foveated rendering, eye tracking, and the like. According to an embodiment, the user usage module 301 further may identify possible future applications the user may use based on the user history information. An example output of the user usage module 301 is shown in Table 1.

TABLE 1

| User | Next Apps | Headset Configuration State |
|---|---|---|
| Adam | Resident Evil 4: Game, | Finger Tracking: On Passthrough: 0% |
| Eve | Meeting VR: Productivity | Foveated Rendering: On, Passthrough: 50% |
| Elena | Journey of the Gods: Game | 3D Audio: On 3D Touch: On |

Figure 4:
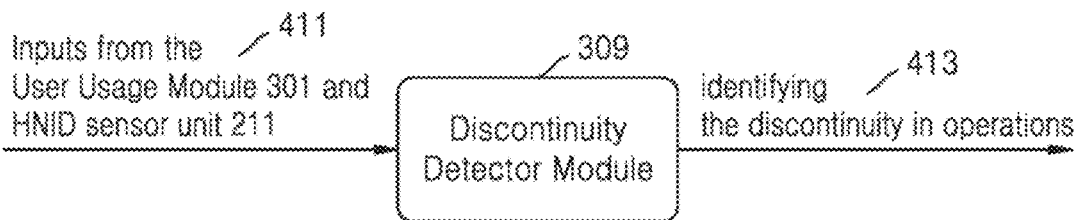
FIG. 4 illustrates an overview of the working of the discontinuity detector module, according to an embodiment of the present disclosure.
Figure 5:
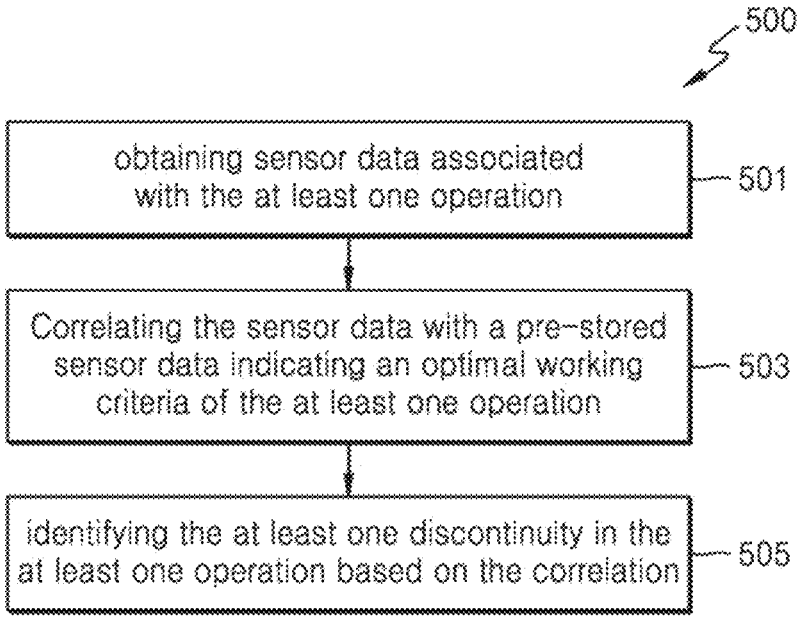
FIG. 5 illustrates a method for identifying a discontinuity in the operations associated with the HMD device, according to an embodiment of the present disclosure.

According to an embodiment, the discontinuity detector module 303 may identify at least one discontinuity in the operations associated with the HMD device while the user is using the VR device. FIG. 4 illustrates an overview of the working of the discontinuity detector module 303, according to an embodiment of the present disclosure. Further, FIG. 5 illustrates a method 500 for identifying the at least one discontinuity in the operations associated with the HMD device, according to an embodiment of the present disclosure. The identification of the at least one discontinuity in the operations will be explained collectively through FIG. 4 and FIG. 5 in the forthcoming paragraphs.

Referring to FIG. 4 and FIG. 5 the discontinuity detector module 303 inputs 411 from the user usage module 301 and the HMD sensor unit 211. In an embodiment, the discontinuity detector module 303 may obtain data related to the least one operation associated with the HMD device 101 from the user usage module 301. For example, consider that in an exemplary embodiment, the user is playing a video game. Further, the identified operation associated with playing the video game may be the hand tracking, the head tracking, a guardian boundary, and the foveated rendering. Further, the discontinuity detector module 303, at operation 501 of method 500, may obtain the sensor data associated with the identified operations of the HMD device from the HMD sensor unit 211. For example, the hand tracking often utilizes data from depth-sensing cameras. In an example, the head tracking uses data from the gyroscopes, the accelerometers, and the external cameras. In an example, the guardian boundary may utilize data from the depth cameras or the infrared sensors, and the foveated rendering uses data from the eye-tracking sensors.

Further, at operation 503, the discontinuity detector module 303 may correlate the sensor data with the pre-stored sensor data. In an embodiment, the pre-stored sensor data may indicate an optimal working criteria of the operations. In an embodiment, for correlating the sensor data with the pre-stored sensor data, the discontinuity detector module 303 may compare a continuous state of the sensor data with respect to a state of the pre-stored sensor data. Consider an example of assessing the quality of input data streams related to the hand tracking operation. According to an embodiment, the quality assessment of the input data streams is performed for the features and output of the features. In an embodiment, the discontinuity detector module 303 may correlate the inputs and outputs with past data to check if there is a discontinuity. Further, the discontinuity detector module 303 may retrieve the state of the pre-stored sensor data from the HMD database 203 and then compare the continuous state of the sensor data with respect to the pre-stored sensor data. Thus, based on any deviation in the operations of the HMD device 101 as compared to the optimal working criteria of the operations, the discontinuity detector module 303, at operation 505, may identify the at least one discontinuity in the operations 413. The at least one discontinuity indicates a degree of discontinuity in the behaviour of the at least one operation. In an embodiment, the discontinuity detector module 303 further may determine an affecting user state due to the discontinuity, for example navigation loss, or control loss. Table 2 depicts an example of a discontinuity measurement. Further, Table 3 depicts an example of the output provided by the discontinuity detector module 303. The discontinuity can be an anomaly of the operation of the VR device, or an interruption in sensor data generated by the VR device.

TABLE 2

| Discontinuity Measurement | Working Parameters |
| --- | --- |
| Irregular Tracking: 40% | Regular Tracking |
| Irregular Tracking: 70% | Regular Tracking against Background |

TABLE 3

| Operation | Discontinuity Measurement | Working Parameters | Discontinuity loss effect |
| --- | --- | --- | --- |
| Hand Tracking | Irregular Tracking: 40% | Regular Tracking | Controls Loss |
| Head Tracking | Irregular Tracking: 70% | Regular Tracking against Background | Navigation: Loss |

According to an embodiment, the discontinuity correlator module 305 may determine ambient parameters around the HMD device 101 causing the at least one discontinuity in the operations. In an embodiment, the discontinuity correlator module 305 may determine the ambient parameters that are causing a problem resulting in the discontinuity of the operations of the HMD device 101. The discontinuity correlator module 305 takes the output of the discontinuity detector module 303 and provides the ambient parameter that can be modified in order to reduce the discontinuity in the operation of the HMD device 101. The working of the discontinuity correlator module 305 will be explained in the forthcoming paragraphs.

FIG. 6 illustrates a method 600 for the determination of the ambient parameters by the discontinuity correlator module 305, according to an embodiment of the present disclosure. According to an embodiment, at operation 601, the discontinuity correlator module 305 may obtain the sensor data from the plurality of sensors in the HMD sensor unit 211, IoT data from the plurality of IoT device 105, data related to the identified the at least one discontinuity in at least one operation associated with the HMD device 101 and the affecting user state due to the discontinuity. In an example, the IoT data may include the IoT device that was currently operating at the current instance.

Further, at operation 603, the discontinuity correlator module 305 may identify at least one of a respective sensor and a respective IoT device that is causing the at least one discontinuity in the operations by using the obtained sensor data and the IoT data. In an example, the discontinuity correlator module 305 may take analog converted raw inputs (i.e. output values of the sensors) that the plurality of sensors are sensing from the IoT devices 105 and the pre-stored sensor data. Further, the discontinuity correlator module 305 may determine a difference between the output values of the obtained sensor data and the pre-stored sensor data. Based on the determined difference, the discontinuity correlator module 305 may compute a gap in the sensor data with respect to the pre-stored data like no sensor data change, sensor unable to pickup difference, etc. Further, from the non-activation phase of the sensor data, the discontinuity correlator module 305 may determine a type of data that was missed. For example, visual data, audio data, etc. In an embodiment, A correlation may be the computed gap in the sensor data with respect to the pre-stored data like no sensor data change, sensor unable to pickup difference, etc.

Further, at operation 605, the discontinuity correlator module 305 may correlate the at least one ambient parameter with the identified at least one discontinuity in the at least one operation. Further at operation 607, the discontinuity correlator module 305 may determine the at least one ambient parameter that is causing the discontinuity based on the correlation.

In an embodiment, the discontinuity correlator module 305 further may determine the required modification in the at least one ambient parameter to fill the computed gap to achieve the optimal (or an improved) working of the at least one operation based on the based on the determined difference. Further, the discontinuity correlator module 305 may determine the required modification in the at least one ambient parameter to fill the computed gap to achieve the optimal (or an improved) working of the at least one operation. For example, the discontinuity correlator module 305 may determine what data from the raw data should have been present, but was not present, like "previous object wasn't found" so that when the ambient parameter related to it when modified fills the computed gap. Table 4 illustrates an example output provided by the discontinuity correlator module 305.

TABLE 4

| Ambient Parameter | Needed Change | Effecting Parameter |
|---|---|---|
| Illumination | Increase | Hand tracking, headset tracking |

As can be seen from the example illustrated in Table 4 the discontinuity correlator module 305 detects the ambient parameter i.e. illumination that is affecting the hand tracking or headset tracking. Thus, if this ambient parameter i.e. illumination is increased then the hand tracking and the headset tracking will be better.

According to an embodiment, the capability correlator module 307 may determine the IoT devices 105 and the capabilities of the IoT devices. According to an embodiment, the capability correlator module 307 may identify at least one IoT device surrounding the HMD device that is capable of modifying the determined at least one ambient parameter. The detailed working of the capability correlator module 307 and the method for identifying the at least one IoT device surrounding the HMD device that is capable of modifying the determined at least one ambient parameter is explained in the forthcoming paragraphs.

FIG. 7 illustrates a method implemented in the capability correlator module 307, according to an embodiment of the present disclosure. According to an embodiment, the capability correlator module 307 may take detected ambient parameters, the required modification in the ambient parameters, and the identified at least one discontinuity in the operations as obtained from the previous modules as an input.

According to an embodiment, the capability correlator module 307 may determine from a pre-existing map of ambient parameters obtained from the IoT database 229, the received ambient parameter with the available IoT capabilities with the user at operation 701. Further, at operation 703, the capability correlator module 307 may determine the primary capabilities along with the secondary capabilities of the IoT devices 105 that can also cause the discontinuity and have an effect on the ambient parameter. Table 5 depicts an example of the determined primary capabilities and the secondary capabilities of the IoT devices 105.

TABLE 5

| Primary Capabilities | Secondary Capabilities |
|---|---|
| Brightness | Light colour, blinds open, display |

Further, at operation 705, the capability correlator module 307 may determine the location of the IoT devices that are near the HMD device 101 that have that capability. For example, the IoT device like a smart bulb in the living room where the user is operating with the HMD device 101 is capable of modifying the illumination. Further, at operation 707, the capability correlator module 307 may check if the IoT devices can be controlled by the user and don't have restrictions. Further, at operation 709, the capability correlator module 307 may compute a value or possible range of the identified IoT device that is required to be modified so as to match with the ambiance that is required. Table 6 depicts the example of the computed range that is required to be modified.

TABLE 6

| Capabilities | IoT device | Possible range |
|---|---|---|
| Light Brightness | Smart Light bulb | 40%-70% |
| Blinds Open | Smart Curtains | Open 10% to 40% |
| Display Light | Television | Screensaver |

Further, at operation 711, the capability correlator module 307 may obtain all the past routines, etc., that have involved the capability from the IoT database 229. Table 7 depicts an example of obtained routines.

TABLE 7

| Capabilities | IoT devices | Routines |
|---|---|---|
| Light Brightness | Light Bulb | Power saving routine |
| Blinds Open | Smart Curtains | Privacy Routine, Night Routine |
| DisplayLight | Television | Sleeping Routine |

Further, at operation 713, the capability correlator module 307 may classify the side effects if the ambient parameter related to the capability of the IoT device is modified. Table 8 depicts an example of the classified side effects.

TABLE 8

| Capability | Affects |
|---|---|
| Light Brightness | Power, Routine met: 40% |
| Blinds Open | Routine Violation |
| Display Light | No effect |

In an embodiment, after identifying at least one IoT device surrounding the HMD device 101 capable of modifying the determined at least one ambient parameter along with other parameters as explained above, the operational characteristic fixer module 309 may control one or more operational characteristics of the identified at least one IoT device to modify the at least one ambient parameter around the HMD device 101 to reduce the at least one discontinuity in the at least one operation. In an example, the operational characteristic fixer module 309 may perform the required modification based on the capability of the identified at least one IoT device. In an embodiment, the operational characteristic fixer module 309 may perform continuous changes and determine the fixed new values of the IoT devices, and control the settings of the capable IoT devices so that the user can use the HMD device 101 efficiently.

FIG. 8 illustrates a method flow 800 of the smart device 103, according to an embodiment of the present disclosure. According to an embodiment, the method 800 is implemented in the smart device 103 via the user usage module
301, the discontinuity detector module 303, the discontinuity correlator module 305, the capability correlator module
307, the operational characteristic fixer module 309. The
detailed working of each of the modules is explained above,
therefore for the sake of brevity, the same is not repeated
here.

According to an embodiment, at operation 801, the discontinuity detector module 303 may identify the at least one
discontinuity in at least one operation associated with the
HMD device 101 while the user is using the HMD device
101. The working of the discontinuity detector module 303
can be envisaged from the explanation provided in FIG. 4,
and FIG. 5. Further, at operation 803, the discontinuity
correlator module 305 may determine at least one ambient
parameter around the HMD device 101 causing the at least
one discontinuity in the at least one operation. The working
of the discontinuity correlator module 305 can be envisaged
from the explanation provided in FIG. 6. Further at operation 805, the capability correlator module 307 may identify
at least one IoT device surrounding the HMD device 101
capable of modifying the determined at least one ambient
parameter. The working of the capability correlator module
307 can be envisaged from the explanation provided in FIG.
7. Further, at operation 807, the operational characteristic
fixer module 309 may control one or more operational
characteristics of the identified at least one IoT device to
modify the at least one ambient parameter around the HMD
device 101 to reduce the at least one discontinuity in the at
least one operation.

According to an embodiment, the method 800 may be
implemented in the HMD device 101 via the user usage
module 301, the discontinuity detector module 303, the
discontinuity correlator module 305, the capability correlator module 307, the operational characteristic fixer module
309. The explanation of the same is provided through the
FIG. 4-FIG. 7. Therefore, for the sake of brevity, the same
is not repeated here.

According to an embodiment, the smart device 103 further may monitor one or more operations of the HMD device
when the at least one ambient parameter is modified with
respect to the determined required modification, the smart
device 103 further may determine, based on the monitoring,
the one or more effects on the operation of the VR device
due to the modification in the at least one ambient parameter.
Further, the smart device 103 may determine a change
required in the identified at least one IoT device to fix the
determined one or more effects on the operation of the VR
device. Further, the smart device 103 notifies the user, the
change required in the identified at least one IoT device.

The forthcoming paragraphs illustrate some use cases to
elaborate on the implementation of the disclosed methodology.

Figure 9:
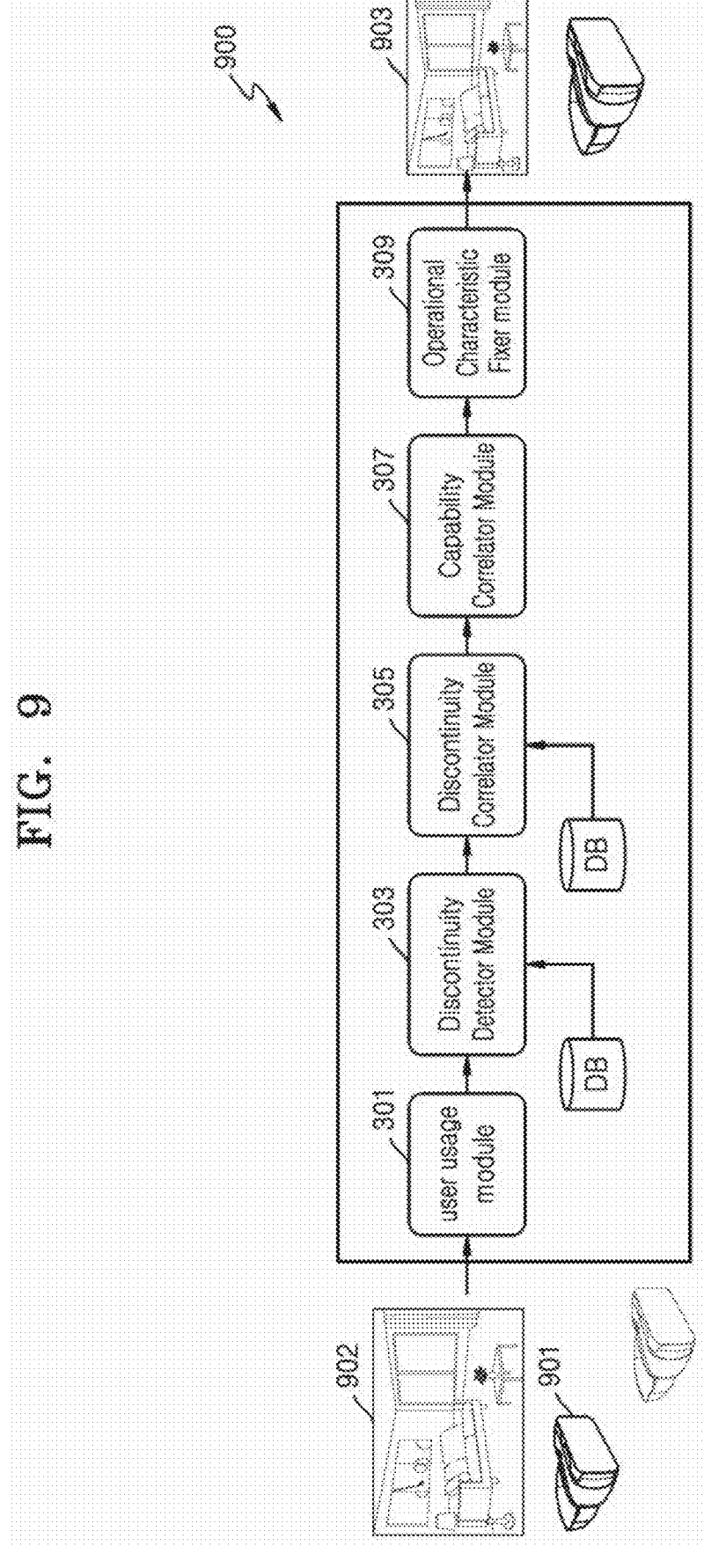
FIG. 9 illustrates an example scenario when the user is using an XR headset in a dimly lit environment.

FIG. 9 illustrates an example scenario 900 when the user
is using an XR headset in a dimly lit environment 902.
According to an embodiment, due to the dimly lit environment, the headset tracking by the XR headset 901 is not
working properly. Due to the low surrounding lights, the
hand tracking and the controller tracking are not working
properly. According to the implemented method 800, the
user usage module 301 may collect various parameters and
track for the XR headset 901. Further, the discontinuity
detector module 303 may identify at least one discontinuity
in at least one operation associated with the XR headset 901
while the user is using the VR device. The performance
tracked by the user usage module 301 is depicted in Table 9.

TABLE 9

| Parameter | Performance Tracker |
|---|---|
| Hand tracking | 28% |
| Headset Tracking | 35% |
| Eye Tracking | 32% |
| Pass-through | 20% |
| Position tracking | 80% |
| Territory marking\| Guardian Scaling | 95% |
| Lens Fogging | 0% |

Based on the tracked performance, the discontinuity
detector module 303 tracked the discontinuity and performance degradation in the hand tracking, the headset tracking, and the pass-through visibility. A rule or AI based
engine is used to identify the performance degradation or
discontinuities. Further, the discontinuity correlator module
305 determines the ambient parameter around the XR device
901 causing the one or more discontinuities and performance degradation. Further, the discontinuity correlator
module 305 correlates the at least one ambient parameter
with the identified at least one discontinuity. Further, the
capability correlator module 307 determines the IoT devices
and the capabilities of the IoT devices that can be modified
to overcome discontinuities in the affected operation. Table
10 and 11 depict the ambient parameter with the identified
at least one discontinuity along with the correlated IoT
devices that are capable of modifying the discontinuities in
the affected operation.

TABLE 10

| Headset Parameter | Environment Parameters | Location | IoT Devices |
|---|---|---|---|
| Hand tracking | Lights [intensity/colour/brightness ], Natural light Exposure | Living Room | Blind, Living Room Light#1, Living Room Light#3 |
| Headset Tracking | Lights [intensity/colour/brightness ] | Living Room | Blind, Living Room Light#1, Living Room Light#3 |
| Eye Tracking | Lights [intensity/colour/brightness ] | Living Room | Blind, Living Room Light#1, Living Room Light#3 |
| Pass-through | Lights [intensity/colour/brightness ], Object density | Living Room | Blind, Living Room Light#1, Living Room Light#3 |

TABLE 11

| IOT Device | Operational Characteristic Change |
|---|---|
| Blind | ON, 70% Open |
| Living Room Light#1 | Brightness: 90% Colour: Bright White |
| Living Room Light#3 | 75% |
| Living Room Light#2 | Brightness: 70% Colour: off White |

The operational characteristic fixer module 309 modifies
the identified IoT devices so that the discontinuities in the
performance get reduced. According to the example embodiment, surrounding lights such as light of smart light bulbs
are brightened to fix the issue, and thus the XR device 901
has improved performance, and may perform optimally in
improved environment 903. Table 12 depicts the accuracy
obtained in the operations of the XR device 901.

TABLE 12

| Parameter | Working Normalized Percentage |
| --- | --- |
| Hand tracking | 83% |
| Headset Tracking | 90% |
| Eye Tracking | 75% |
| Pass-through | 100% |

Consider a scenario where the user is using a virtual reality fitness platform in "RoomScale" Boundary mode via the HMD device 101. Thus, it is required to move within a designated space. Further, while using the virtual reality fitness platform the discontinuity detector module 303 has identified a potential issue where the user's guardian boundary gets disrupted, leading to a break in the boundary's continuity. The discontinuity correlator module 305 identified the issue related to the discontinuity, which is a result of the negative space ambient parameter that is crucial for ensuring the seamless operation of the guardian boundary. To address this, the capability correlator module 307 identifies the correlated IoT devices like robot vacuum cleaner (RVC) in the nearby surrounding. Accordingly, the operational characteristic fixer module 309 reconfigures RVC to avoid entering the guardian space, as their presence could obstruct areas of the room and interfere with maintaining the boundary's continuity.

According to an example scenario, consider that the user is using a fitness application by using the HMD device. The system identified several issues while the user was using the fitness application. For example, due to vigorous exercise, the discontinuity detector module 303 identifies that the user is perspiring heavily, and headset is also slipping. Further, the discontinuity correlator module 305 has identified a disruption in the readings of the heart rate sensor within the HMD. The discontinuity correlator module 305 linked the disruption in the readings of the heart rate sensor to ambient parameters such as air flow and air humidity of the surrounding ambient parameter. In response, the operational characteristic fixer module 309 adjusts the parameters of the nearby IoT devices like the air purifier and the air conditioner to operate in dehumidification mode and decrease the room's temperature, aiming to rectify the discontinuities and effective working of the HMD device.

According to an example scenario, consider that the user is navigating a virtual environment while using an application to observe real-world spaces. However, the discontinuity detector module 303 detects a disruption in the head tracking functionality when the user moves their head diagonally or alters the yaw and pitch, resulting in the headset's inability to accurately track these movements. Further, the discontinuity correlator module 305 also detects a high illumination in the ambiance. For example, due to the bright light in the ambiance, the system identifies that the user is facing difficulties with head rotation tracking. Further, the discontinuity correlator module 305 identifies that the HMD device is in a low power state and needs to consume additional power to edit the image and mitigate the impact of the excessive light to compensate for excessively high illumination, the HMD device is forced to work harder, utilizing additional computational resources to reduce the effect of the illumination. The capability correlator module 307 attributes this issue to the ambient illumination parameter, deducing that the environment is excessively bright in certain areas. As a solution, the operational characteristic fixer module 309 adjusts the lighting in the room, reducing overall brightness and incorporating more light sources like smart light bulb to ensure continuous and accurate head tracking.

According to the disclosed techniques, the technical advantage of this system is its real-time environmental adaptation capability. By detecting and analyzing ambient parameters such as illumination, the system can dynamically modify the ambiance parameters to optimize the user experience by reducing the discontinuities. This real-time adaptation enhances immersion and user comfort by addressing issues, ensuring a more seamless and responsive virtual reality experience.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While certain embodiments of the disclosure has been particularly shown and described, it will be understood that various changes in form and details may be made therein without departing from the spirit and scope of the following claims.

According to an embodiment of the disclosure, the method for identifying the at least one discontinuity in the at least one operation may include obtaining the sensor data associated with the at least one operation. According to an embodiment of the disclosure, the method for identifying the at least one discontinuity in the at least one operation may include correlating the sensor data with a pre-stored sensor data indicating an optimal working criteria of the at least one operation to obtain a correlation. According to an embodiment of the disclosure, the method for identifying the at least one discontinuity in the at least one operation may include identifying the at least one discontinuity in the at least one operation based on the correlation.

According to an embodiment of the disclosure, the correlating the sensor data with the pre-stored sensor data may comprise comparing a continuous state of the sensor data with respect to a state of the pre-stored sensor data.

According to an embodiment of the disclosure, the at least one discontinuity may indicate a degree of discontinuity in a behaviour of the at least one operation.

According to an embodiment of the disclosure, the determining the at least one ambient parameter may comprise obtaining, from a plurality of sensors and the at least one IoT device, sensor data and IoT data. According to an embodiment of the disclosure, the determining the at least one ambient parameter may comprise identifying, based on the obtained sensor data and the IoT data, at least one of a respective sensor and a respective IoT device associated with the at least one discontinuity in the at least one operation. According to an embodiment of the disclosure, the determining the at least one ambient parameter may comprise correlating the at least one ambient parameter with the at least one discontinuity in the at least one operation to obtain a correlation. According to an embodiment of the disclosure, the determining the at least one ambient parameter may comprise determining the at least one ambient parameter based on the correlation.

According to an embodiment of the disclosure, the identifying at least one IoT device capable of modifying the at least one ambient parameter may comprise determining from a pre-existing map of ambient parameters obtained from the IoT database. According to an embodiment of the disclosure, the identifying at least one IoT device capable of modifying the at least one ambient parameter may comprise determining the primary capabilities along with the secondary capabilities of the IoT devices that can also cause the discontinuity and have an effect on the ambient parameter. According to an embodiment of the disclosure, the identifying at least one IoT device capable of modifying the at least one ambient parameter may comprise determining the location of the IoT devices that are near the VR device that have that capability. According to an embodiment of the disclosure, the identifying at least one IoT device capable of modifying the at least one ambient parameter may comprise checking if the IoT devices can be controlled by the user and don't have restrictions. According to an embodiment of the disclosure, the identifying at least one IoT device capable of modifying the at least one ambient parameter may comprise computing a range to match with the ambience needed change from the current state of the IoT device. According to an embodiment of the disclosure, the identifying at least one IoT device capable of modifying the at least one ambient parameter may comprise obtaining all the past routines that have involved the capability. According to an embodiment of the disclosure, the identifying at least one IoT device capable of modifying the at least one ambient parameter may comprise classifying the side effects if the ambient parameter related to the IoT device is modified.

According to an embodiment of the disclosure, the controlling the one or more operational characteristics of the at least one IoT device may comprise determining a modification in the at least one ambient parameter to achieve an improved working of the at least one operation. According to an embodiment of the disclosure, the controlling the one or more operational characteristics of the at least one IoT device may comprise controlling the one or more operational characteristics of the at least one IoT device to perform the modification based on a capability of the at least one IoT device.

According to an embodiment of the disclosure, determining the modification in the at least one ambient parameter may comprise determining a difference between output values of the sensor data and a pre-stored sensor data. According to an embodiment of the disclosure, determining the modification in the at least one ambient parameter may comprise determining, based on the difference, the modification in the at least one ambient parameter to fill a computed gap to achieve the improved working of the at least one operation.

According to an embodiment of the disclosure, determining the modification in the at least one ambient parameter may comprise monitoring one or more operations of the VR device when the at least one ambient parameter is modified with respect to the modification. According to an embodiment of the disclosure, determining the modification in the at least one ambient parameter may comprise determining, based on the monitoring, one or more effects on operation of the VR device due to the modification in the at least one ambient parameter. According to an embodiment of the disclosure, determining the modification in the at least one ambient parameter may comprise determining a change in the at least one IoT device to fix the one or more effects on the operation of the VR device. According to an embodiment of the disclosure, determining the modification in the at least one ambient parameter may comprise notifying, to the user, the change in the at least one IoT device.

According to an embodiment of the disclosure, to identify the at least one discontinuity in the at least one operation, the one or more processors may be configured to obtain the sensor data associated with the at least one operation. According to an embodiment of the disclosure, to identify the at least one discontinuity in the at least one operation, the one or more processors may be configured to correlate the sensor data with a pre-stored sensor data indicating an optimal working criteria of the at least one operation to obtain a correlation. According to an embodiment of the disclosure, to identify the at least one discontinuity in the at least one operation, the one or more processors may be configured to identify the at least one discontinuity in the at least one operation based on the correlation.

According to an embodiment of the disclosure, the correlating the sensor data with the pre-stored sensor data may comprise comparing a continuous state of the sensor data with respect to a state of the pre-stored sensor data.

According to an embodiment of the disclosure, the at least one discontinuity may indicate a degree of discontinuity in a behaviour of the at least one operation.

According to an embodiment of the disclosure, to determine the at least one ambient parameter, the one or more processors may be configured to obtain, from a plurality of sensors and the at least one IoT device, sensor data and IoT data. According to an embodiment of the disclosure, to determine the at least one ambient parameter, the one or more processors may be configured to identify, based on the obtained sensor data and the IoT data, at least one of a respective sensor and a respective IoT device associated with the at least one discontinuity in the at least one operation. According to an embodiment of the disclosure, to determine the at least one ambient parameter, the one or more processors may be configured to correlate the at least one ambient parameter with the at least one discontinuity in the at least one operation to obtain a correlation. According to an embodiment of the disclosure, to determine the at least one ambient parameter, the one or more processors may be configured to determine the at least one ambient parameter based on the correlation. According to an embodiment of the disclosure, to control the one or more operational characteristics of the at least one IoT device, the one or more processors may be configured to determine a modification in the at least one ambient parameter to achieve an improved working of the at least one operation. According to an embodiment of the disclosure, to control the one or more operational characteristics of the at least one IoT device, the one or more processors may be configured to control the one or more operational characteristics of the at least one IoT device to perform the modification based on a capability of the at least one IoT device.

According to an embodiment of the disclosure, to determine the modification in the at least one ambient parameter, the one or more processors may be configured to determine a difference between output values of the sensor data and a pre-stored sensor data. According to an embodiment of the disclosure, to determine the modification in the at least one ambient parameter, the one or more processors may be configured to determine, based on the difference, the modification in the at least one ambient parameter to fill a computed gap to achieve the improved working of the at least one operation.

According to an embodiment of the disclosure, the one or more processors may be configured to monitor one or more operations of the VR device when the at least one ambient parameter is modified with respect to the modification. According to an embodiment of the disclosure, the one or more processors may be configured to determine, based on the monitoring, one or more effects on operation of the VR device due to the modification in the at least one ambient parameter. According to an embodiment of the disclosure, the one or more processors may be configured to determine a change in the at least one IoT device to fix the one or more effects on the operation of the VR device. According to an embodiment of the disclosure, the one or more processors may be configured to notify, to the user, the change in the at least one IoT device.

According to an embodiment of the disclosure, the discontinuity may be an interruption in the sensor data.

According to an embodiment of the disclosure, the method of controlling a Virtual Reality (VR) device in an internet of Things (IoT) environment, the method may include obtain sensor data from the VR device. According to an embodiment of the disclosure, the method of controlling a Virtual Reality (VR) device in an internet of Things (IoT) environment, the method may include detecting an anomaly in at least one operation of the VR device while a user is using the VR device, based on the sensor data. According to an embodiment of the disclosure, the method of controlling a Virtual Reality (VR) device in an internet of Things (IoT) environment, the method may include determining an ambient condition of the VR device associated with the anomaly. According to an embodiment of the disclosure, the method of controlling a Virtual Reality (VR) device in an internet of Things (IoT) environment, the method may include identifying an IoT device capable of modifying the ambient condition. According to an embodiment of the disclosure, the method of controlling a Virtual Reality (VR) device in an internet of Things (IoT) environment, the method may include instructing the IoT device to adjust operation to modify the ambient condition to reduce the anomaly.

According to an embodiment of the disclosure, the anomaly may be an interruption in the sensor data.

According to an embodiment of the disclosure, above apparatus and method may overcome at least some of the above deficiencies.

What is claimed is:

1. A method performed by an apparatus configured to connect with a Virtual Reality (VR) device in an Internet of Things (IoT) environment, the method comprising:
    obtaining sensor data from the VR device;
    based on the sensor data, identifying at least one discontinuity in at least one operation associated with the VR device while a user is using the VR device;
    determining at least one ambient parameter around the VR device associated with the at least one discontinuity in the at least one operation;
    identifying at least one IoT device capable of modifying the at least one ambient parameter; and
    controlling one or more operational characteristics of the at least one IoT device to modify the at least one ambient parameter around the VR device to reduce the at least one discontinuity in the at least one operation.

2. The method as claimed in claim 1, wherein the identifying the at least one discontinuity in the at least one operation comprises:
    correlating the sensor data with a pre-stored sensor data indicating an optimal working criteria of the at least one operation to obtain a correlation, wherein the sensor data comprises data associated with the at least one operation, and the at least one discontinuity in the at least one operation is identified based on the correlation.

3. The method as claimed in claim 2, wherein the correlating the sensor data with the pre-stored sensor data comprises comparing a continuous state of the sensor data with respect to a state of the pre-stored sensor data.

4. The method as claimed in claim 2, wherein the at least one discontinuity indicates a degree of discontinuity in a behavior of the at least one operation.

5. The method as claimed in claim 1, wherein the determining the at least one ambient parameter comprises:
    obtaining, from a plurality of sensors and the at least one IoT device, the sensor data and IoT data;
    identifying, based on the sensor data and the IoT data, at least one of a respective sensor and a respective IoT device associated with the at least one discontinuity in the at least one operation; and
    correlating the at least one ambient parameter with the at least one discontinuity in the at least one operation to obtain a correlation, wherein the at least one ambient parameter is determined based on the correlation.

6. The method as claimed in claim 1, wherein the identifying the at least one IoT device capable of modifying the at least one ambient parameter comprises:
    determining, from a pre-existing map of ambient parameters obtained from an IoT database, available IoT capabilities;
    determining primary capabilities and secondary capabilities of IoT devices that can cause the at least one discontinuity and have an effect on the at least one ambient parameter;
    determining a location of each of the IoT devices that are near the VR device and that are capable of modifying the at least one ambient parameter;
    checking if the IoT devices can be controlled by the user and do not have restrictions;
    computing a range to match with an ambience needed change from a current state of the at least one IoT device;
    obtaining past routines that have involved a capability of the at least one IoT device; and
    classifying side effects if the at least one ambient parameter related to the at least one IoT device is modified.

7. The method as claimed in claim 1, wherein the controlling the one or more operational characteristics of the at least one IoT device comprises:
    determining a modification in the at least one ambient parameter to achieve an improved working of the at least one operation; and
    controlling the one or more operational characteristics of the at least one IoT device to perform the modification based on a capability of the at least one IoT device.

8. The method as claimed in claim 7, wherein determining the modification in the at least one ambient parameter comprises:
    determining a difference between output values of the sensor data and a pre-stored sensor data; and
    determining, based on the difference, the modification in the at least one ambient parameter to fill a computed gap to achieve the improved working of the at least one operation.

9. The method as claimed in claim 8, further comprising:
    monitoring one or more operations of the VR device when the at least one ambient parameter is modified with respect to the modification;

determining, based on the monitoring, one or more effects on operation of the VR device due to the modification in the at least one ambient parameter;

determining a change in the at least one IoT device to fix the one or more effects on the operation of the VR device; and notifying, to the user, the change in the at least one IoT device.

10. An apparatus configured to connect with a Virtual Reality (VR) device in an Internet of Things (IoT) environment, the apparatus comprising:

at least one memory storing instructions;

one or more processors operatively connected to the at least one memory, and configured to execute the instructions to:

obtain sensor data from the VR device;

based on the sensor data, identify at least one discontinuity in at least one operation associated with the VR device while a user is using the VR device;

determine at least one ambient parameter around the VR device associated with the at least one discontinuity in the at least one operation;

identify at least one IoT device capable of modifying the at least one ambient parameter; and control one or more operational characteristics of the at least one IoT device to modify the at least one ambient parameter around the VR device to reduce the at least one discontinuity in the at least one operation.

11. The apparatus as claimed in claim 10, wherein to identify the at least one discontinuity in the at least one operation, the one or more processors are configured to:

correlate the sensor data with a pre-stored sensor data indicating an optimal working criteria of the at least one operation to obtain a correlation, wherein the sensor data comprises data associated with the at least one operation, and the at least one discontinuity in the at least one operation is identified based on the correlation.

12. The apparatus as claimed in claim 11, wherein the correlating the sensor data with the pre-stored sensor data comprises comparing a continuous state of the sensor data with respect to a state of the pre-stored sensor data.

13. The apparatus as claimed in claim 11, wherein the at least one discontinuity indicates a degree of discontinuity in a behavior of the at least one operation.

14. The apparatus as claimed in claim 10, wherein determine the at least one ambient parameter, the one or more processors are configured to:

obtain, from a plurality of sensors and the at least one IoT device, the sensor data and IoT data;

identify, based on the sensor data and the IoT data, at least one of a respective sensor and a respective IoT device associated with the at least one discontinuity in the at least one operation; and correlate the at least one ambient parameter with the at least one discontinuity in the at least one operation to obtain a correlation, wherein the at least one ambient parameter is determined based on the correlation.

15. The apparatus as claimed in claim 10, wherein to control the one or more operational characteristics of the at least one IoT device, the one or more processors are configured to:

determine a modification in the at least one ambient parameter to achieve an improved working of the at least one operation; and control the one or more operational characteristics of the at least one IoT device to perform the modification based on a capability of the at least one IoT device.

16. The apparatus as claimed in claim 15, wherein to determine the modification in the at least one ambient parameter, the one or more processors are configured to:

determine a difference between output values of the sensor data and a pre-stored sensor data; and determine, based on the difference, the modification in the at least one ambient parameter to fill a computed gap to achieve the improved working of the at least one operation.

17. The apparatus as claimed in claim 16, wherein the one or more processors are configured to:

monitor one or more operations of the VR device when the at least one ambient parameter is modified with respect to the modification;

determine, based on the monitoring, one or more effects on operation of the VR device due to the modification in the at least one ambient parameter;

determine a change in the at least one IoT device to fix the one or more effects on the operation of the VR device; and notify, to the user, the change in the at least one IoT device.

18. The method of claim 1, wherein the at least one discontinuity is an interruption in the sensor data.

19. The apparatus of claim 10, wherein the at least one discontinuity is an interruption in the sensor data.

20. A non-transitory computer-readable storage medium storing instructions that, when executed by at least one processor, cause the at least one processor to:

obtain sensor data from the VR device;

based on the sensor data, identify at least one discontinuity in at least one operation associated with the VR device while a user is using the VR device;

determine at least one ambient parameter around the VR device associated with the at least one discontinuity in the at least one operation;

identify at least one IoT device capable of modifying the at least one ambient parameter; and control one or more operational characteristics of the at least one IoT device to modify the at least one ambient parameter around the VR device to reduce the at least one discontinuity in the at least one operation.

* * * * *